H. A. Norris,
Drawing Maps,
No. 1,662.  Patented June 27, 1840.
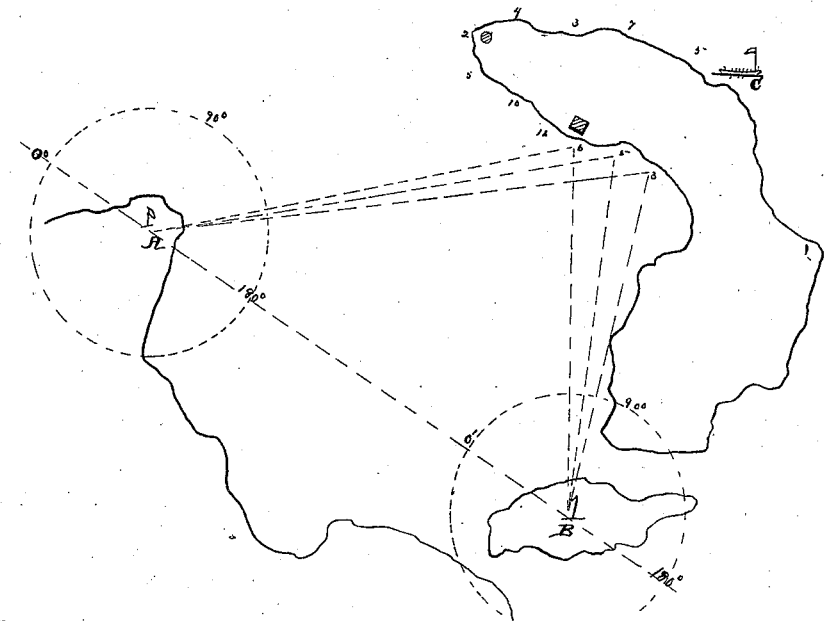
Witnesses;
Thos H. Norris
William G Hunt
Inventor;
H. A. Norris

UNITED STATES PATENT OFFICE.

H. ARIEL NORRIS, OF NEW YORK, N. Y.

ART OF HYDROGRAPHIC SURVEYING.

Specification of Letters Patent No. 1,662, dated June 27, 1840.

*To all whom it may concern:*

Be it known that I, H. ARIEL NORRIS, of the city of New York, in the county and State of New York, have invented a new and Improved Method of Hydrographic and Topographic Surveying; and I do hereby declare that the following is a full and exact description thereof.

The nature of my invention consists in a greatly facilitated system of triangulation; the angles being measured from the extremities of one or more base lines to a moving flag (or other mark) simultaneously and at regular intervals of time, one chronometer (or other correct time keeper) governing the measurement of angles upon the base lines, and another, set to the first, governing the soundings and other examinations of the party accompanying the moving flag on land or on water.

To enable others skilled in the art to understand and use my invention, I will describe its arrangement and operation, supposing a simple case where one base line is used and the object is to survey a harbor.

Two observers A and B (see accompanying drawing) are placed, in a harbor to be surveyed, at proper points thereof, each observer has a theodolite, (or other instrument for measuring horizontal angles) a chronometer, a flag-staff, set of signal flags, and a man to make signals, or watch for them with a spyglass, as may be required. The sounding boat C is furnished with a chronometer, a flag-staff, set of signal flags, sounding lead and line, and is manned with a proper crew and commanded by a competent surveyor.

We will suppose observations and soundings are to be made every minute, one of the observers, A, for example, is selected to make the signals by his chronometer, and the other chronometers are compared with it, say ten seconds before the commencement of an even minute, A's man raises a flag calling out "Up;" "Up," repeats B's man, who is on the alert with spy-glass in hand; both A and B, having thus a simultaneous warning, direct their theodolite telescopes upon the boat's flag, and follow its motion by means of their tangent screws until A's flag falls at the exact commencement of the minute, his man calling out "Down," as does B's man who is watching for the fall of the flag; at the same time the lead is hove in the boat by the boat's chronometer; from the instant that their men call out "Down," both A and B cease to move their instruments, each reads the angle of his instrument and write it down opposite the hour and minute (by chronometer) when taken; the surveyor in the boat writes down the depth of water opposite the time in like manner; their notes would read as follows:

| A.'s notes. | | | B.'s notes. | | | C.'s notes. | | |
|---|---|---|---|---|---|---|---|---|
| H. | M. | Angle. | H. | M. | Angle. | H. | M. | Depth. |
|    |    | °   ′  |    |    | °   ′  |    |    |        |
| VIII | 5 | 221 02 | VIII | 5 | 310 41 | VIII | 5 | 19½ |
|      | 6 | 220 45 |      | 6 | 310 09 |      | 6 | 18 |
|      | 7 | 219 51 |      | 7 | 309 22 |      | 7 | 19 |
|      | 8 | 219 09 |      | 8 | 308 54 |      | 8 | 20¼ |
|      | 9 | 218 14 |      | 9 | 308 10 |      | 9 | 21¼ |

The same process is repeated every minute; the boat proceeds regularly over the ground to be surveyed, the lead is hove and the angles taken.

This method is no less applicable to surveying on land; the horizontal angles taken to a flag carried over the ground would give points in horizontal projection, and angles of elevation or depression would determine their rise or fall.

Currents in air or water may be ascertained by angles taken from two or more stations to bodies floating in such currents, and if angles of elevation and depression are also taken, the path of a meteor or other body in air might be determined.

The surveyor in the boat has his note books ruled to receive the angles of the observers, which are copied into it as occasion permits. The drawing contains a representation of such a book when the notes are complete. Those notes are commenced at the bottom of the page. The line X Y represents the path of the boat developed upon a straight line, and the figures on the right of that line express the distances from the boat to the right hand shore at the respective times recorded in the column designated "Time." Were the shore on the left hand, those distances would be written on the left side of the line X Y. Those distances when small may be estimated accurately enough by a practised eye.

To plot the work on paper the points A and B are established by triangulation in the ordinary manner; two circular protractors are then placed upon those points so that their readings may correspond with those of the theodolite at the stations upon the ground, the angles are then laid off in pairs and the positions of the boat formed by the intersections of lines as indicated in the figure. The column marked "Depth" gives the soundings, and the "Topographical notes," the data for delineating the shore and objects adjacent. Where three or more theodolites are used, upon the ground, additional protractors are of course used in the drawing.

What I claim as my invention and desire to secure by Letters Patent, is as follows:

1. The method herein described of enabling the bearing or angles of the boat or moving body to be taken, at the same instant, from the extremities of one or more base lines, by the use of timekeepers and signals arranged and operated upon the principle herein set forth; the principal object of which arrangement is to determine the boat or moving body's position without stopping its progress, thus executing the survey more rapidly.

2. In combination with the foregoing, the method herein described of enabling the soundings (or other notices and examinations of the surveyor accompanying the moving body) to be made at the same instant the angles are taken, by the employment of a timekeeper for ascertaining the times, previously agreed on, at which the soundings (or other examinations) should be taken and the angles measured.

H. ARIEL NORRIS.

Witnesses:
JACOB R. BRUSH,
THOS H. NORRIS,
WILLIAM G. HUNT.